C. ANDERSON.
PAN LIFTER.
APPLICATION FILED APR. 21, 1908.
906,986.
Patented Dec. 15, 1908.
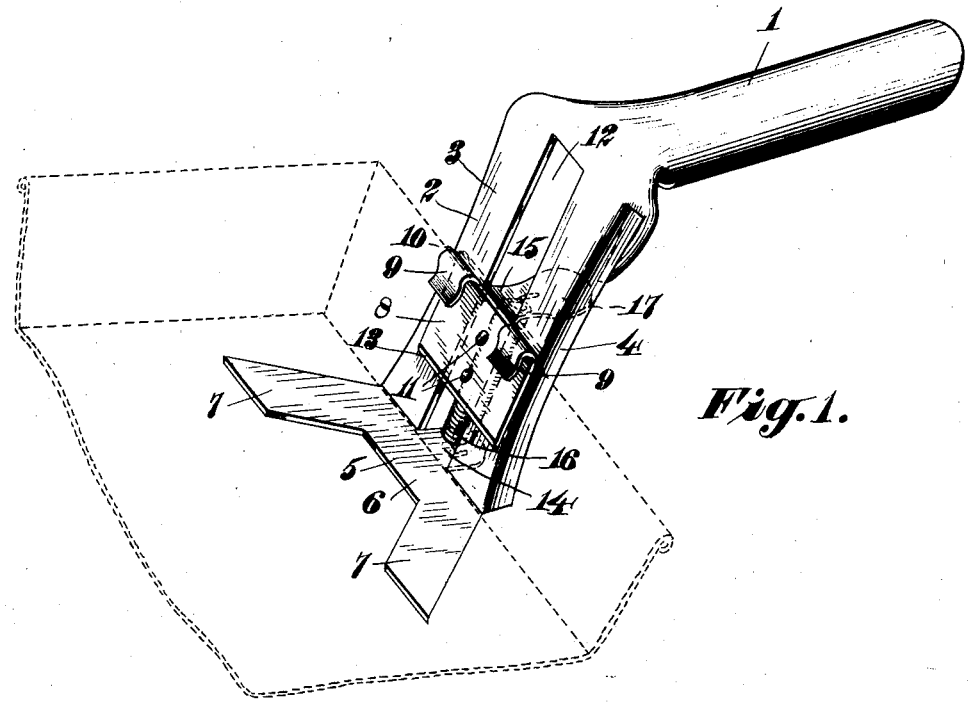
Fig. 1.
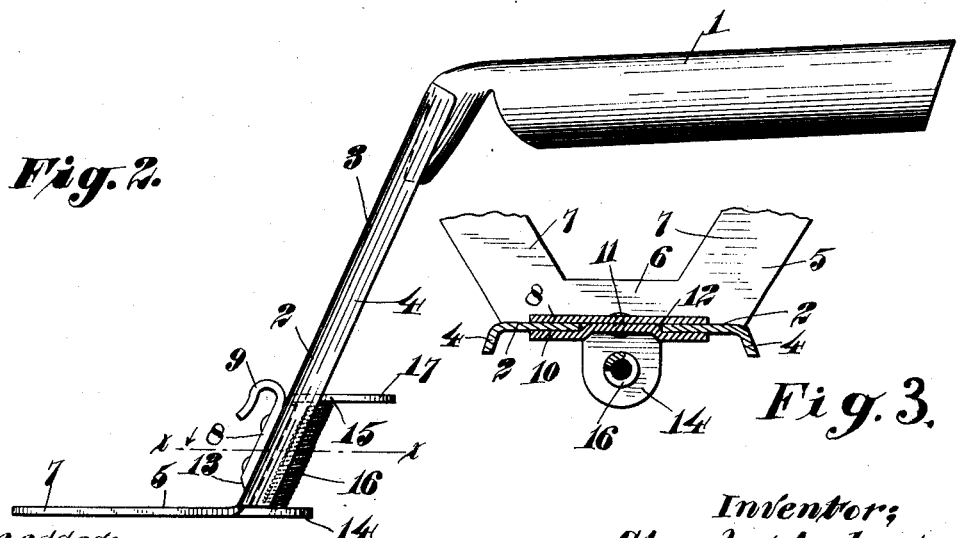
Fig. 2.
Fig. 3.
Witnesses;
A. A. Olson
P. J. McAllister
Inventor;
Charles Anderson
by
Joshua R. H. Potts
Att'y.

UNITED STATES PATENT OFFICE.

CHARLES ANDERSON, OF CHICAGO, ILLINOIS.

PAN-LIFTER.

No. 906,986.     Specification of Letters Patent.     Patented Dec. 15, 1908

Application filed April 21, 1908. Serial No. 428,430.

*To all whom it may concern:*

Be it known that I, CHARLES ANDERSON, a citizen of the United States, residing at Chicago, county of Cook, and State of Illinois, have invented certain new and useful Improvements in Pan-Lifters, of which the following is a specification.

My invention relates to pan lifters, and the object of my invention is to provide a device by means of which, a hot pan may be lifted either from the top of the stove, or the oven.

A further object of my invention, is to provide a device as mentioned, which shall be of simple construction and readily operated with one hand.

A further object of my invention, is to provide a pan lifter which will grasp the pan at one side only without spanning the same, and which will firmly support the pan from beneath.

A further object of my invention is to provide a device of the class mentioned, which shall securely hold pans of all sizes from shallow ones to those of considerable depth, that is from a shallow pie pan to a deep baking pan.

Other objects will appear hereinafter.

With these objects in view, my invention consists generally in a handle, a depending portion preferably formed integrally with the handle and centrally slotted, a slide mounted in said slot and having a hook portion to engage the upper edge or rim of a pan and a foot portion extending horizontally from the depending portion and adapted to extend beneath the bottom of the pan, and a spring for holding said hook in engagement with the pan.

My invention further consists in a handle, a depending portion extending downwardly therefrom, said depending portion being preferably flat and having a central slot extending from top to bottom thereof, a slide mounted in said slot and having a hook to engage the rim of a pan, a foot formed on the bottom of the depending portion and adapted to extend beneath the pan, the foot comprising a pair of diverging arms giving a stable base for the pan to rest upon.

My invention further consists in a handle, a depending portion, a horizontal foot at the lower end of said depending portion to extend beneath the pan, a slide on said depending portion, means on said slide for engaging the rim of a pan, and a spring for clamping said device on a pan.

My invention further consists in a pan lifter characterized as above mentioned, and provided with means whereby the slide may be lifted by a finger of the hand which grasps the handle.

My invention further consists in various details of construction and arrangements of parts, all as will be hereinafter fully described and particularly pointed out in the claim.

My invention will be more readily understood by reference to the accompanying drawings forming a part of this specification, and in which, Figure 1 is a perspective view of a pan lifter embodying my invention in its preferred form, Fig. 2 is a side elevation thereof, and Fig. 3 is a detail section on the line *x*—*x* of Fig. 2.

Referring to the drawings, 1 indicates the handle which is preferably tubular and formed of stout sheet metal. Depending from the end of the handle is a substantially vertical or slightly inclined portion 2. This is preferably formed integrally with the handle and presents a broad, flat front face 3, the side edges of the portion 2 are slightly curved as shown, slightly contracting the width of the central portion, and the edges are turned backwardly forming the flanges 4, which constitute strengthening ribs to prevent bending of the portion 2. Formed upon the lower end of the portion 2 is a spread foot portion 5 which consists of the horizontal flange 6 and a pair of angularly disposed or diverging arms 7—7.

Mounted upon the front face of the portion 2 is a slide 8 which consists of a rectangular plate having a pair of hooks 9—9 formed integrally therewith and extending outwardly and downwardly from the upper edge thereof. To hold the slide in place, a similar plate 10 is arranged upon the back or rear face of the member 2, and riveted or otherwise securely attached to the plate 8 as at 11. To this end, the portion 2 is provided with a slot 12, extending from bottom to top thereof, and the plates 8 and 10 are connected through the slot, the edges of said slot serving as ways or guides for the slide. The lower edge of the plate 8 is preferably beveled as at 13 to prevent catching upon the upper edge or rim of the pan. The foot 5 is provided with an ear 14 which extends rearwardly from the bottom of the slot 12, and the slide or more correctly the plate 10 is provided with an ear or lug 15.

16 indicates a spring connected to the lugs 14 and 15 normally holding the slide in lowered or depressed position. The ear or lug 15 is somewhat extended or elongated forming a finger piece 17 by means of which, the slide is raised.

In using the device, the handle 1 is grasped with one hand and the forefinger is extended beneath the finger piece 17 and raises the same until the hooks 9 are near the top of the portion 2. The foot portion is then slipped under the pan, and the slide released, the spring then depressing the hooks to engage the upper edge or rim of the pan. By inverting the device, the foot portion may be used to draw the pan to the front of the oven where it may be readily grasped by the lifter.

Having described my invention what I claim as new and desire to secure by Letters Patent, is:

A pan lifter formed of sheet metal and comprising a handle, a depending flat portion at one end thereof and a foot portion extending horizontally from the depending portion, said depending portion being centrally and vertically slotted, in combination with a slide mounted in said slot and comprising a pair of plates mounted one upon the front face and the other upon the back of said depending portion and connected through said slot, a hook upon the front plate to engage the upper edge of a pan a lug upon the rear plate, a lug extending rearwardly from said foot and a spring interposed between said lugs, substantially as described.

In testimony whereof I have signed my name to this specification in the presence of two subscribing witnesses.

CHARLES ANDERSON.

Witnesses:
HOWARD S. AUSTIN,
ANNA L. EKVALL.